April 22, 1969  R. T. WARNER ET AL  3,440,537
BAR-GRAPH DISPLAY INSTRUMENT

Filed Aug. 20, 1963  Sheet 1 of 7

INVENTORS.
ROBERT T. WARNER
ROBERT R. CHRISTY
BY
W. H. Maxwell
AGENT

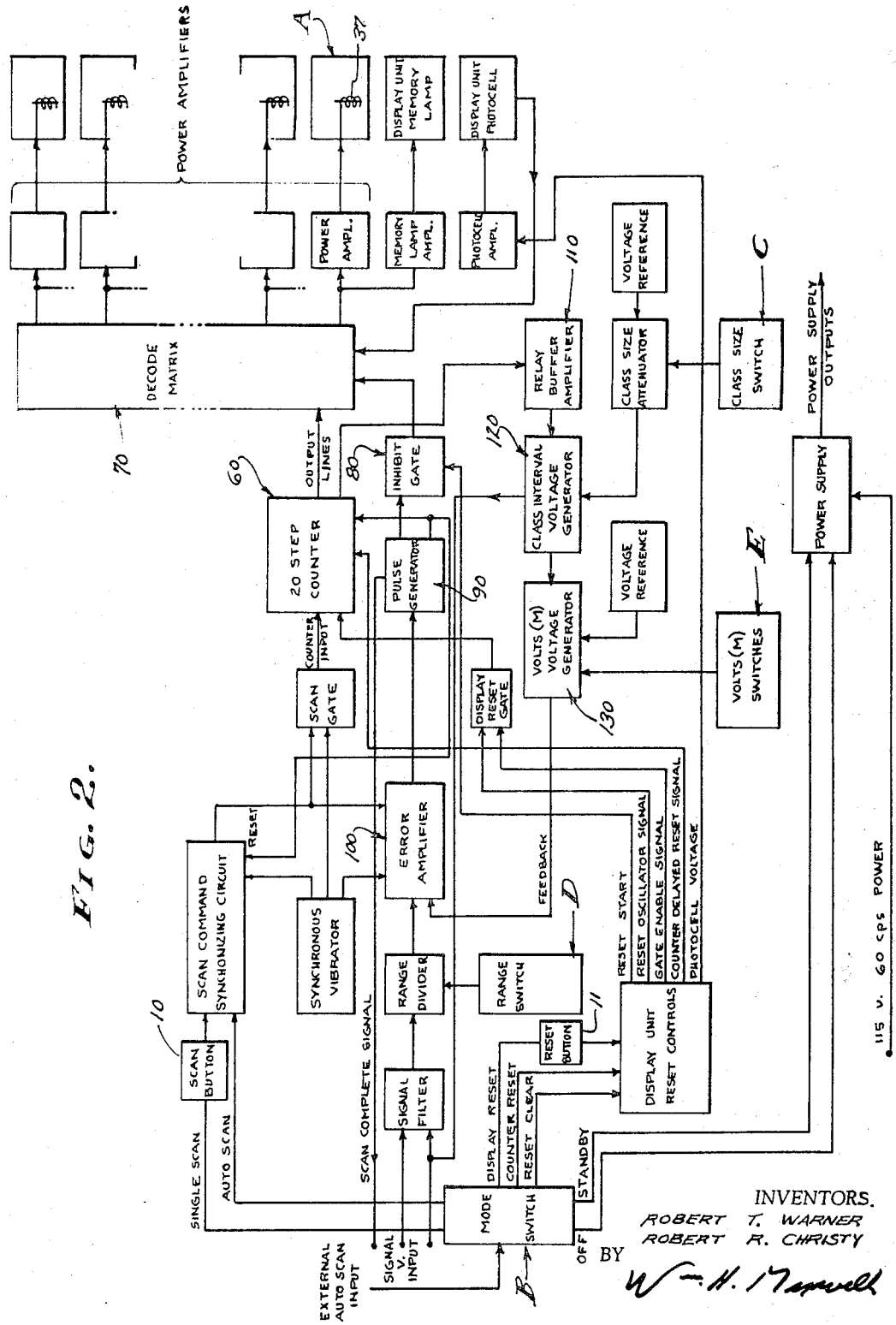

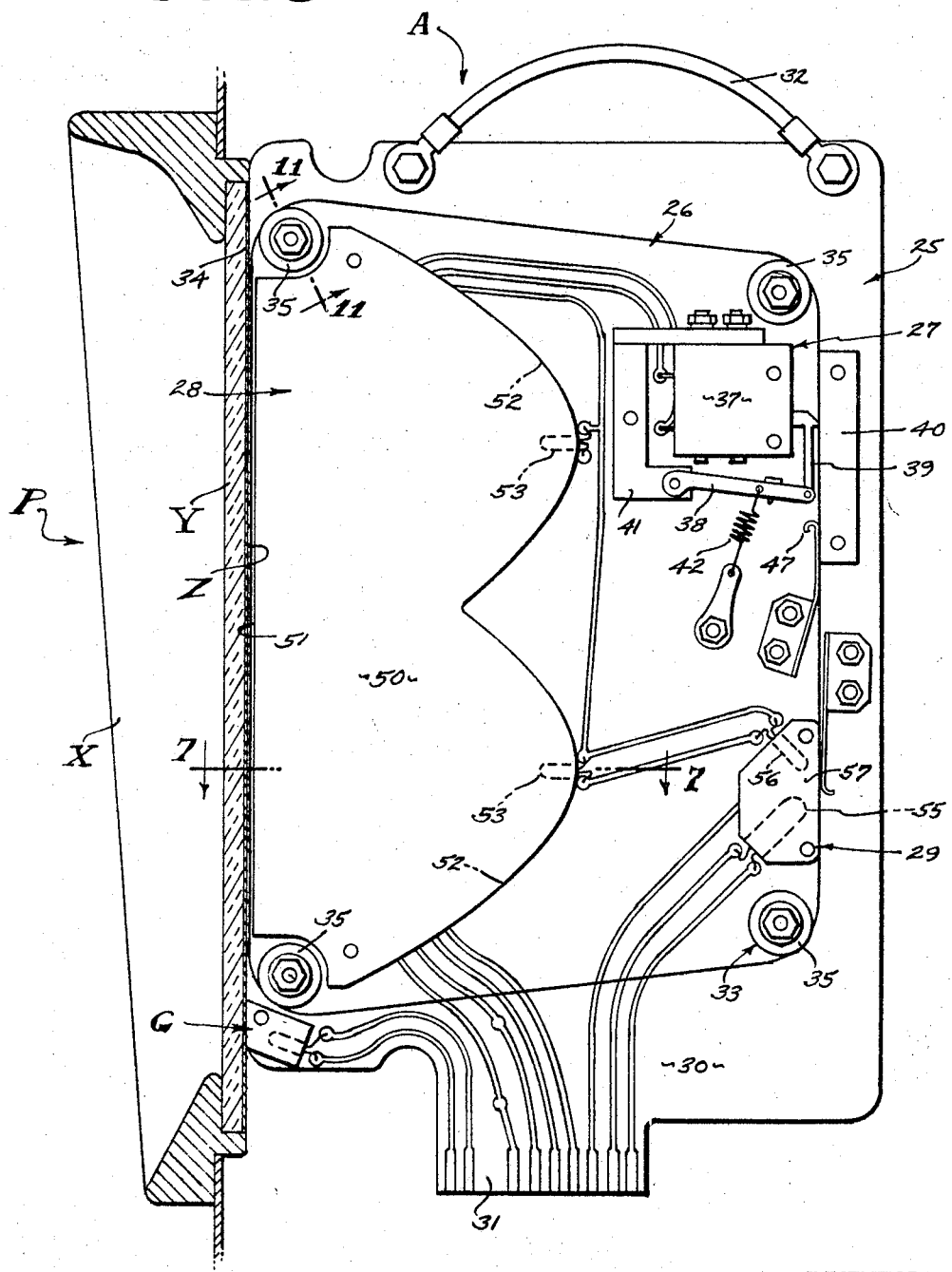

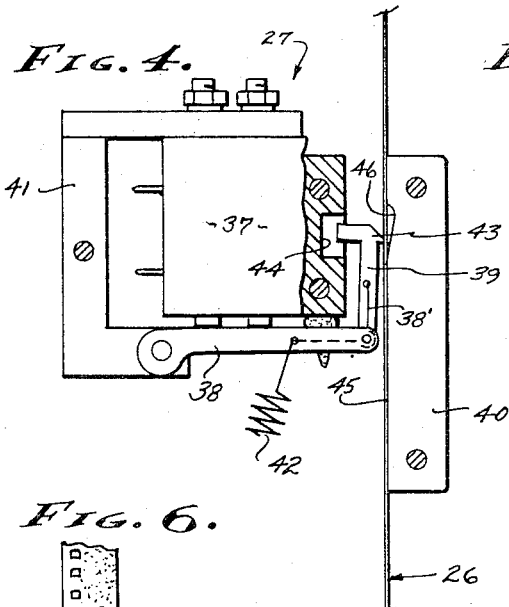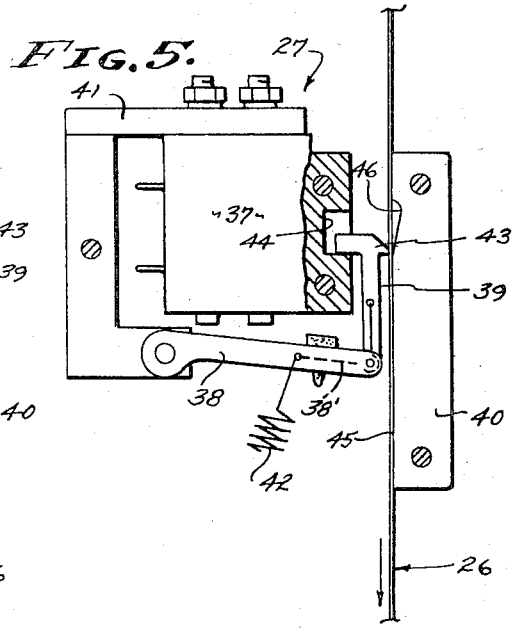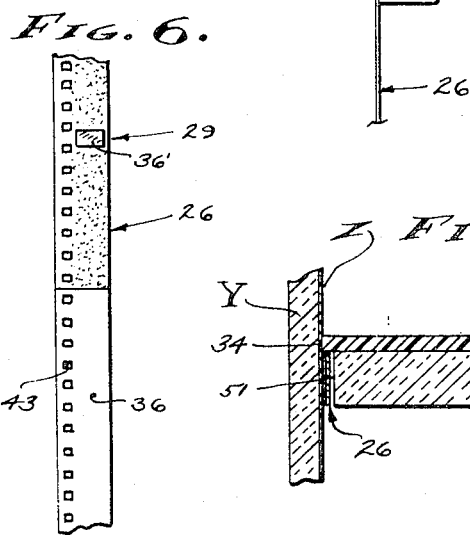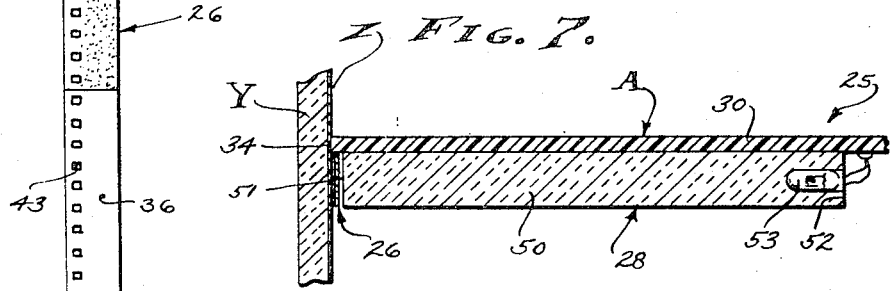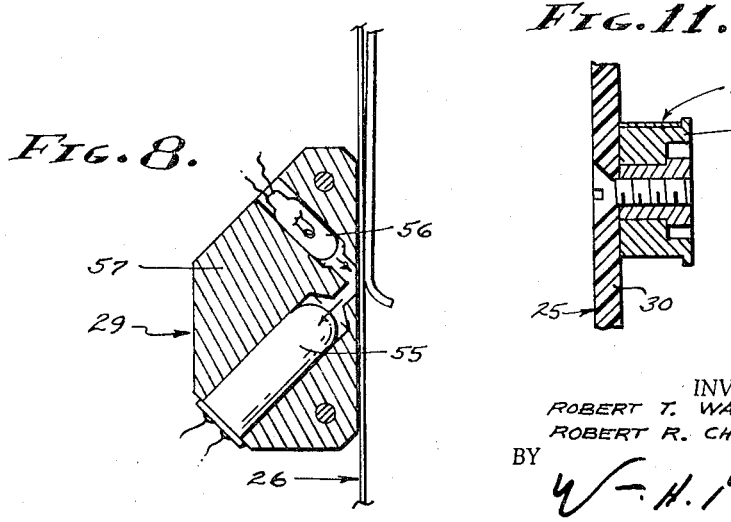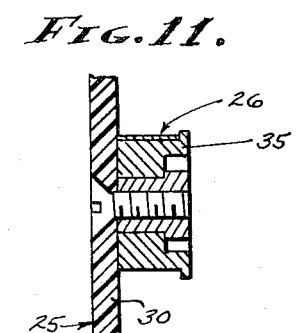

ONE DECODING GATE & MATRIX DIODS

INVENTORS.
ROBERT T. WARNER
ROBERT R. CHRISTY
BY
AGENT

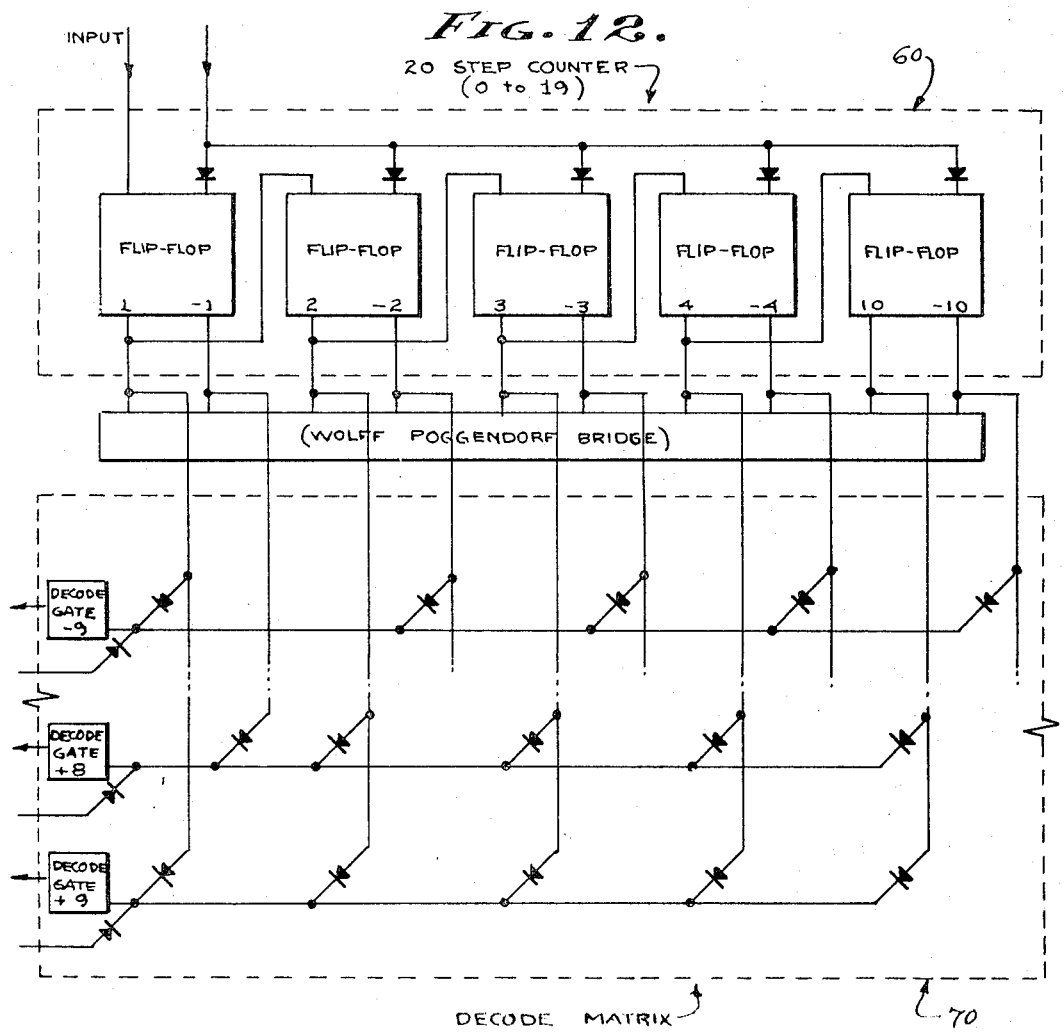
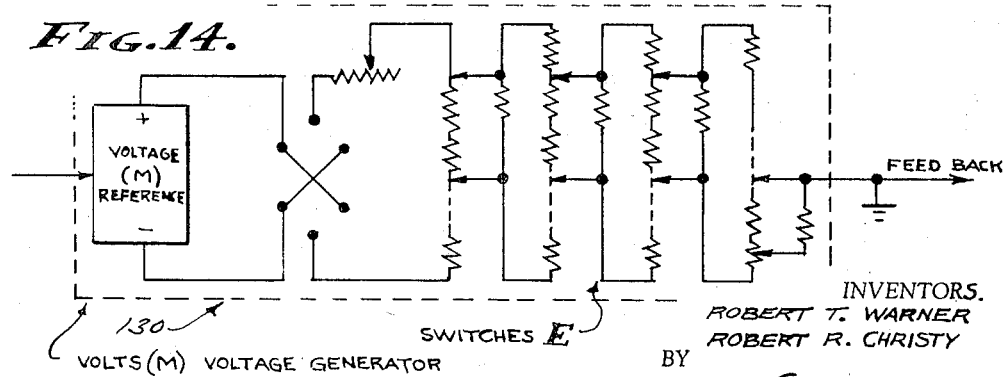

United States Patent Office

3,440,537
Patented Apr. 22, 1969

3,440,537
BAR-GRAPH DISPLAY INSTRUMENT
Robert T. Warner, Poway, and Robert R. Christy, Lemon Grove, Calif., assignors to Non-Linear Systems, Inc., Del Mar, Calif., a corporation of California
Filed Aug. 20, 1963, Ser. No. 303,283
Int. Cl. G01r 13/04, 17/06; H03k 5/20
U.S. Cl. 324—113           2 Claims This invention relates to a statistical instrument and is particularly concerned with a digital voltmeter that presents a visual bar-graph, it being a general object of this invention to provide an instrument that operates instantaneously to present statistical data in compiled form for visual observation by technicians in order to trace problems to their source.

Technicians engaged in manufacturing, development, research or any one of the numerous scientific and industrial disciplines who are using statistical sampling techniques are doing so because they desire to increase the quality level of their products, testing accuracy, and for developmental work by accumulating data on the process involved. In order for the data to be useful it must be assembled into a meaningful form convenient for analyses and record keeping. The samples of data, e.g., a group of voltage measurements, are studied using mathematical statistical principles to provide a basis for the study of the samples. It has been common practice to assemble such data manually, make records thereof, and to manually plot bar-graph charts which show the dispersion of the data within or about established limits. This manner of taking statistical samples is not only slow and laborious but is also concerned only with past history of the process involved. Alternatively, the data is often recorded on punched cards, or other data processing devices similar in nature—paper tape, magnetic tape, etc., and then assembled and programmed into a computer for analysis and plotting. Such a procedure, although sophisticated and complete is time-consuming and requires valuable computer time to the detriment of other programs. Furthermore, said alternative is concerned only with the past history of the process.

An object of this invention is to provide an electronic apparatus in the form of a unit which presents current data in the form of a visual bar-graph and which makes possible the instantaneous accumulation of data in the form of an attractive lighted display. The scatter of the data between high and low limits of measurement is immediately determinable by technicians skilled in the use of such control charts. That is, for example, a shift or change in the shape or character of the frequency distribution is often a signal or indication which will trigger, with no further delay, a thorough investigation of existing techniques in the process involved. This makes possible an immediate diagnosis of existing and current problems and also permits the technician to be acutely aware of variations in many areas of his operations, whether it be one of production, testing, research, or development or any like operation. Meanwhile, operations need not be stopped to await information from responsible technicians who have been alerted that quality level has decreased, even when said technicians are informed well in advance of the normal time that they would have noticed trouble when using outdated or overly complex data measurement and collection techniques heretofore employed for this purpose.

Another object of this invention is to provide an electronically operable bar-graph that is sensitive to electrical impulses and which electro-mechanically operates to present visual bars of varying extent in response to data signals received from data samples. The primary purpose of the statistical instrument hereinafter disclosed is to provide an immediate visual display of the dispersion of statistical samples of data by means of a multi-class, electromechanical bar-graph display. Electronic measuring and classifying circuitry is combined with an electromechanical display unit to separate each data sample into one of a multiplicity of classes, and to enter said classified data sample into the display unit for storage and visual display therein. This accumulated data is presented in the form of a brilliantly lighted multi-class bar-graph display which represents the frequency distribution of the accumulated data samples. The extent or vertical height of each of the "light bars" in the display is proportional to the accumulated readings falling into each class. As shown, a vertical scale and horizontal bar on edge-lighted plexiglass permits, a technician to readily determine the number of readings accumulated per class, directly from the height of the multiplicity of vertically disposed lighted bars.

It is another object of this invention to provide individual replaceable and independently operable bar units for incorporation in an instrument of the character thus far referred to, and which are electromechanically responsive to classified data signals and which accumulate and store data individually, whereby a graph or bar-graph is created or generated and made visible for immediate determination of the information compiled.

It is still another object of this invention to provide a bar or bar-graph unit of the character above referred to which presents a uniformly lighted bar of discrete extent and wherein lighting thereof is uniform and brilliant. The design of the instrument illustrated is such that a nineteen class bar-graph display, associated scales, controls, and legends are all illuminated for easy visibility. Further, a permanent record of the compilation of accumulated entries is readily made of the instrument by taking a photograph of the front panel thereof.

Also, it is an object of this invention to provide a step operated advancing mechanism responsive to electronically furnished signals and which also provides for resetting to a null position. Convenience and speed of resetting the bar-graph display to a null position is a prime feature of the instrument, and to this end portions of the electronics used for measurement and classification are also used to reset the electromechanical display to said null position.

The various objects and features of this invention will be fully understood from the following detailed description of the typical preferred form and application thereof, throughout which description reference is made to the accompanying drawings, in which:

FIG. 2 is a block diagram of the electrical circuitry involved.

Figure 1:
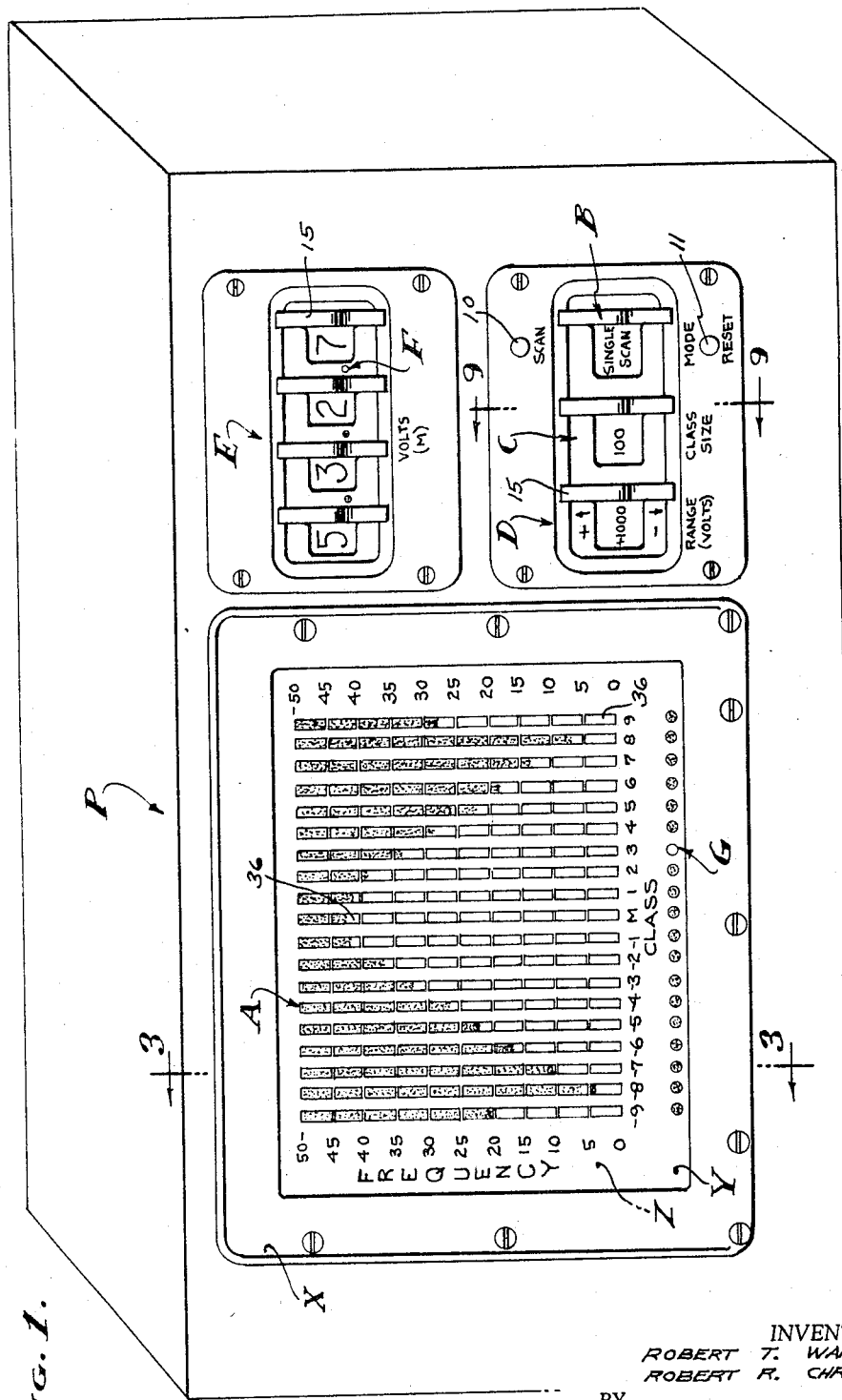
FIG. 1 is a front oblique view of the instrument showing the entire display panel thereof.
Figure 9:
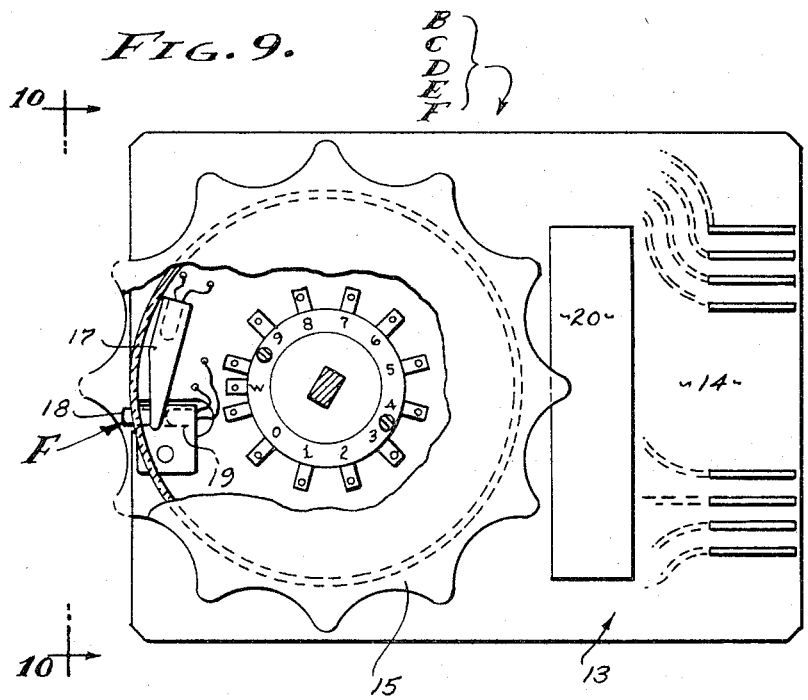
Figure 10:
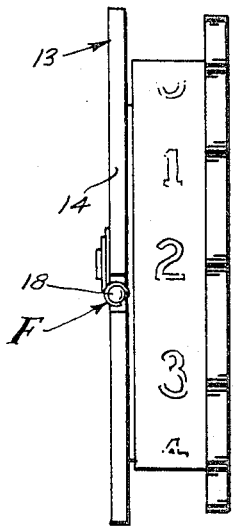
Figure 13:
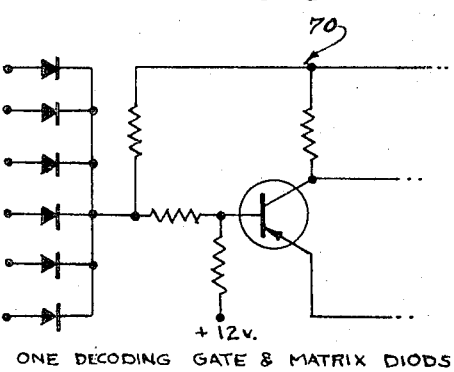
Figure 15:
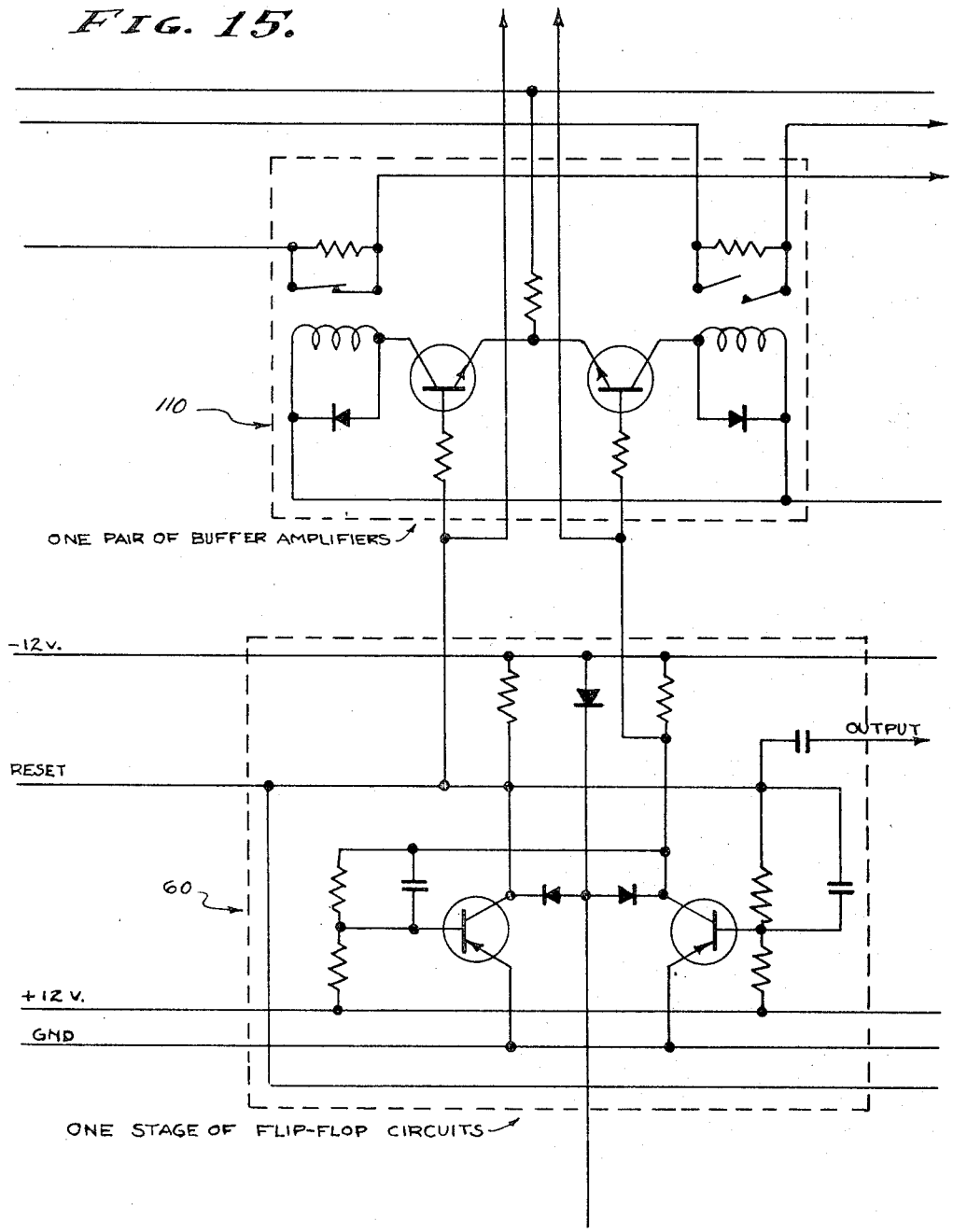

FIG. 3 is an enlarged transverse sectional view taken as indicated by line 3—3 on FIG. 1. FIGS. 4 and 5 are enlarged detailed views of a portion of the structure shown in FIG. 3, with parts broken away to show in section, FIG. 4 showing an actuated position and FIG. 5 an advanced position of parts. FIG. 6 is a fragmentary view of a portion of the belt which characterizes the invention. FIG. 7 is an enlarged section taken substantially as indicated by line 7—7 on FIG. 3. FIG. 8 is an enlarged detailed view showing the relationship of the belt, and the lamp and photocell that is employed. FIGS. 9 and 10 are enlarged views showing the thumbwheel switches, FIG. 9 being a view taken as indicated by line 9—9 on FIG. 1 and FIG. 10 being taken as indicated by line 10—10 on FIG. 9. FIG. 11 is an enlarged detailed sectional view taken as indicated by line 11—11 on FIG. 3. FIGS. 12, 13 and 14 are electrical diagrams showing portions of the block diagram in greater detail, and FIG. 15 is an electrical diagram of a portion of the circuit shown in FIG. 12.

As best illustrated in FIG. 1 the instrument is a unit housed within a cabinet and characterized by a display panel P having a multiplicity of visible bars. These bars are each part of display units hereinafter described and they are disposed vertically side by side within a frame X and behind a protective transparent shield Y. Further, the instrument is designed for the presentation of statistical information in graph form, specifically a bar-graph, and to this end a mask Z is provided in the form of a film adjacent the shield Y and having imposed thereon the necessary markings and indicia as shown.

Parameters which are to be measured in the accumulation of statistical analyses and/or data display can be sensed in the form of electrical signals i.e., voltages, and those parameters which are not intrinsically voltages can be converted into voltages by means of appropriate transducers. The instrument herein disclosed measures, classifies and displays such voltages and compares each voltage in a sample lot to a pre-selected value and automatically enters it into the correct class in a readout display panel P. One bar is associated with each of a multiplicity of voltage classes, preferably nineteen voltage classes. The visual entry of the voltage into the appropriate class is made by increasing the size or length of the visual bar by discrete increments or steps. The total capacity of each visual bar, as shown, is fifty steps. The voltage comparison and classification cycle can be initiated through a manual push button control 10, through a relay contact closure, or through a voltage pulse. When an entire sample lot of voltages has been classified and recorded, the display panel P is reset to a null condition by actuating a push button control 11.

Entries into the instrument can be made manually one at a time or automatically. Automatic entry requires an external sequencer, such as an electromechanical scanner to sequentially apply the voltages to the input of the instrument and to supply appropriate signals as by means of a relay contact closure and voltage pulse, synchronized with the sequencer so as to cause the instrument to measure and classify each voltage.

In accordance with the invention the instrument involves the following elements which are visible at the display panel P: there is a multiplicity of bar-graph display units A, each of which is capable of independently compiling data associated with a given class of information. There is a mode switch B operable through a plurality of positions including "OFF," "STANDBY," "SINGLE SCAN," "AUTO SCAN," annd "RESET." There is a class size switch C operable, for example, through nine incremental values or positions. There is a range switch D having, for example, six positions of different value. There are volts (M) switches E, preferably a plurality thereof and each operable through ten positions. Finally, there are decimal lights F each placed to the right of the most significant digit to which it is associated.

The mode switch B, class size switch C, and range switch D are constructed alike and a typical cross-section thereof is shown in FIG. 9 of the drawings. Each switch B, C, D, and also E, has a frame 13 involving a printed circuit board 14, a thumbwheel 15 with its periphery projecting from the frame for manual engagement at the exterior of the panel P, and with a plurality of electrical contacts 16 for making and breaking appropriate circuits. The wheel 15 comprises a drum of light transmitting material upon which indicia is imposed and there is an illuminating means 17 within the drum in order to illuminate said indicia when it overlies said means. In the case of the volts (M) switches E, there is incorporated the decimal light F which comprises a jewel 18 or the like, and an illuminating means 19 underlying the same and operable when energized to provide an illuminated dot. Further, and as clearly illustrated, each of the switches B, C, D and E incorporates various hardware in order to be complete and operable including bearings, detents, and suitable electrical contact circuitry. Thus, these switches are thumbwheel switches with illuminated indicia that rotate in a planar perpendicular to the panel P. The number of positions and specific indicia of each switch depends upon its intended function as required and as indicated and described.

The mode switch B is a five position switch that controls the operating conditions of the instrument. The function of the "OFF" position is obvious. In the "STANDBY" position all power supplied voltages and lamps are turned on and the instrument is conditioned so that it cannot respond to entry commands. The "SINGLE SCAN" position allows single entries to be made when the scan button 10 is pushed, once for each entry. The "AUTO SCAN" position disables the "SINGLE SCAN" condition and permits entries to be made under automatic control of external sequencing devices. The "RESET" position of the mode switch is interlocked with the reset button 11 to permit the display to be cleared to a null condition by pushing said reset button only when the mode switch is in the "RESET" position. For any other position of the mode switch the reset button 11 is ineffective.

The class size switch C has nine positions with the indicia 1, 2, 5, 10, 20, 50, 100, 200, and 500. When the range switch is in either the + or −10 volt position, for example, each of the above numbers represents the width of a class in millivolts, i.e. the lower number means 1 millivolt and the highest 500 millivolts. Therefore, the switch C has incorporated therein a resistor package 20 with individual resistors for determining the width of the class, as indicated above.

The range switch D permits the technician to select a range of operation into which the sample voltages are expected to fall, as shown it has six positions, three positions for positive and three positions for negative polarity voltages. The magnitudes of the voltage ranges are 0 to 10 v., 10 v. to 100 v., and 100 v. to 1000 v. Therefore, the switch D has incorporated therein a resistor package 20 (the same as switch C) with individual resistors for determining the range as indicated immediately above.

In the particular case illustrated there are four thumbwheel switches or volts (M) switches E, each identical with the other and each with ten positions, 0 through 9. The decimal indication lights F are controlled by the range switch D and are located to the right of the most significant digits or switches E selected by the said range switch. These controls are used to establish the comparison point, i.e., the expected value of the measurement. The value (M) which corresponds to the central light bar labeled M may be set to values from 0000 v. to 999.9 v. Location of the decimal point or light F by means of range switch D determines the magnitude of the number. The decimal location is fixed by the range switch which illuminates a lamp in but one of the three decimal locations.

The relative coarseness or clarity with which voltage comparison and classification is made about the expected value (M) is determined by the setting of the class size switch C. Values higher than (M) are classified into light bars 1 through 9 while values lower than (M) are classified into light bars −1 through −9. The width represented by the light bar, i.e. class of voltages, is numerically equal to the number setting of the class size switch C in millivolts when the range switch is in the + or −10 volt position. A multiplying factor of 10 must be applied to the class size numbers as the range switch is moved to the higher ranges in decade increments. Thus, a voltage scale exists in discrete increments. For example, if volts (M) switches E are set to 5.000 and range switch D to the +10 volt position and the class size switch C to 1, the instruments is then set to measure 5.000 volts and to classify into the nine adjacent channels on either side of light bar M voltages that differ from 5.000 with a resolution of 1 millivolt increments. The lowest and highest values of voltage represented by the scale are then 4.990 and 5.009 respectively. By calibration, the location of the values of (M) along the scale may be made to coincide with values of voltage in the range 4.999 to 5.000. The display unit immediately adjacent to the right then represents voltages falling within a range of 5.000 to 5.001 and so on. The location of the single value volts (M) relative to the class of voltages represented by the display unit at M in the display panel P is arbitrary. This may be visualized by associating the number 5.000 with the right hand edge and 4.999 with the left hand edge of display unit at M of the above example. A change in calibration could have made 5.000 represent the exact center of the bar so that in this instance the class of voltages represented by light bar M would be 4.9995 to 5.0005. The technician's preference will determine the desired calibration.

There is a class indicator lamp G located directly below each of the nineteen display units A. The lamp G is incorporated in each unit A as hereinafter described and indicates, by being turned on, which one of the nineteen units A received an entry. A succeeding entry into a different unit A will cause the indicator lamp G under this unit to turn on and the preceding lamp, any one of the remaining eighteen, to turn off. For successive entries into the same unit A the lamp will be turned on with the first entry and simply remain on continually for the remainder of said successive entries.

In accordance with the invention there is a multiplicity of identical bar-graph display units A, each of which is independently capable of compiling data. A characteristic feature of the instrument herein disclosed is that each display unit A compiles data associated with a predetermined class of information. As shown in FIG. 3 of the drawings the display unit A involves generally a carriage 25, a belt 26, drive means 27, illuminating means 28, null means 29, and various other features as shown and later described.

The display unit A is a flattened construction adapted to be illuminated for observation along one edge thereof, and in the case illustrated there are nineteen units A which are disposed side by side in adjacent relationship and with the said one edge of each unit disposed in a common plane. The said common plane is the plane of observation at which bar-graphs are developed, and whereat each unit A forms one bar of the said bar-graph.

The unit A and carriage 25 can vary in form and detail of constructon. However, in accordance with the invention each unit A is constructed as a module of the instrument so that it is readily replaceable and repairable. In its preferred form the carriage 25 involves a circuit board 30 with an electrical connector portion 31 at its lower end and with a bail 32 for manipulation at its upper end. The board 30 is flat as is usual practice, and the elements 26–29 are mounted at one side of the board as shown in FIG. 3. The board circuitry, as it is generally illustrated, is conducted to the various elements in the usual manner and need not be described. However, a characteristic feature of the carriage 25 is the provision of belt supporting means 33 thereon and which guides the belt 26 along the said one observation edge of the carriage. Thus, the carriage can be said to have top and bottom, and front and back edges, it being the front edge 34 which is the observation edge along which the visible portion of the belt 26 is trained. It is preferred that the belt 26 be a continuous loop, in which case the supporting means 33 comprises guide pulleys 35 at each corner of the board 30, over which the belt 26 is loosely trained, being captured in place by suitable flanges on each pulley 35.

The belt 26 is a flexible belt of film-like material that can be illuminated and/or through which light can pass, partially or substantially completely. The belt 26 normally tends to lie straight as it extends between the pulleys 35. At least one margin of the belt 26 is punched or perforated at uniform intervals for engagement by the drive means 27. In accordance with the invention the belt 26 is made opaque except for at least one portion 36 thereof which is left transparent or translucent and through which light can pass. The portion 36 is of a longitudinal extent to equal the height of the bar-graph, or as is indicated by the "FREQUENCY" graduations 0 to 50 in FIG. 1. Further, the said portion 36 is substantially coextensive with the extent of the edge 34, or substantially the height of the unit A.

The drive means 27 is a device supported on the board 30 of carriage 25 and which is adapted to move the belt 26 one discrete interval per signal from the electronics of the instrument. The means can be located as desired and is preferably located at the back edge of the unit A so as to engage the portion of the belt 26 opposite and parallel to the portion of the belt at the front edge 34. Since it is desired to raise the belt portion 36 from the "FREQUENCY" graduation 0 upwardly to the graduation 50, then the means 27 drives downwardly on the belt loop by engagement with the perforations therein. The means 27 is electromechanical and involves generally an electromagnet 37, a lever 38 actuated by the magnet 37, a pawl 39 reciprocated by the lever 38, and an anvil 40 to guide the belt 26 and to control action of the pawl 39.

The electromagnet 37 and lever 38 operate as a unit and will be described as such, the two elements being supported on a frame 41 that fixedly mounts the magnet 37 and which pivotally mounts the lever 38. The lever 38 is pivoted remote from the plane of the belt 26 and is oscillates through an arc and is disposed substantially normal to the plane of the belt, while the axis of the magnet 37 is substantially normal to one side of a lever 38, in this case the upper side thereof. As a result, the lever 38 is attracted to the magnet 37, being of ferrous material, so as to move through a limited arc, there being a snubber to stop the lever against the frame 41.

The pawl 39 is pivoted to the swinging end of the lever 38 to extend upwardly and substantially parallel to the belt 26. An advance means is provided in the form of a spring 42 anchored to the board 30 and which yieldingly urges the lever and pawl downwardly. Therefore, the magnet 37 is employed to retract the device whereupon the spring 42 operates to advance the belt by engagement of a tooth 43 at the free end of the pawl and which tooth engages into successive perforations in the belt. In accordance with the invention, the tooth 43 is formed as part of a head at the top and free end of the pawl, having a downwardly disposed drive face normal to the plane of the belt and having an inclined back face converging to the tooth point. Thus, the tooth will engage in the belt perforations to drive downwardly and will retract from the perforations upon upward movement. Further, there is a recess 44 in the frame 41 and which engages the head on the pawl so as to limit downward movement thereof.

The anvil 40 is provided to guide the belt so as to maintain a portion thereof at a given plane, and to govern the action of the pawl 39 so as to initiate retraction of the tooth 43 at the end of each step of movement. The anvil has a flat face 45 for sliding engagement with the back side of the belt 26, and a cam face 46 is disposed opposite the recess 44, said face 46 being upwardly inclined away from the belt 26 in order to permit full engagement of the tooth 43 at the top limit of its movement. It will be apparent that the tooth will be gradually cammed to have a bare engagement with the belt by the time it reaches the downward limit of its movement.

The belt 26 is frictionally restrained against movement except as by the means 27 above disclosed, and to this end a presser 47 yieldingly engages the belt 26 to force it against the anvil 40. Thus, the belt 26 is held in each successively advanced position as it is moved one step at a time. A feature of the means 27 is the provision of a hair-spring 38' which biases the tooth 43 so that it is yieldingly pressed and enters the next successive perforation in the belt 26, all to the end that the continuous belt 26 is transported as circumstances require.

The illuminating means 28 characterizes the instrument and is adapted to uniformly and to brilliantly illuminate the portion 36 of the belt at the edge 34. It is an object to uniformly light the belt 26 intermediate the pulleys 35 and substantially coextensive with the height of edge 34. Thus, a body 50 of light transporting material is placed behind the edge 34, preferably of acrylic, and having a straight and flat face 51 to guide the belt 26 to maintain a flat condition thereof. The body 50 is flat sided, being of about the same thickness as the width of belt 26 and is provided with an internally reflective back face 52. A bore enters the back face 52 to house a lamp 53 within the body 50 and the back face 52 is shaped so as to uniformly reflect light within the acrylic body 50 and so that it emanates forwardly at the face 51. In the preferred form, the vertical extent of face 51 requires a plurality of arcuately curved back faces 52, each with a lamp 53 centrally located. The light transporting ability of the acrylic body 50 provides virtually uniform lighting when employing the internally reflective faces 52, as shown.

The null means 29 is provided to sense the position of the belt 26 and is preferably a photoelectric device that senses the presence of a light reflective area 36' on the belt 26. As shown, the means 29 involves a photocell 55 and a lamp 56 supported in a block 57, all located adjacent the belt 26 at a position so as to stop the belt 26 at a starting position. The light reflective area 36' is of limited size and is placed upon the belt 26 and facing the block 57, as shown. The block 57 has two diagonally disposed right angle bores therein, one to house the photocell 55 and the other to house the lamp 56, and each bore opens at a face adjacent the plane of the belt 26 to be exposed to the area 36'. A presser holds the belt 26 against the block 57, whereby the photocell 55 reacts to light from lamp 56 reflected when the said area 36' is aligned with said bores.

A simplified block diagram of the instrument is shown in FIG. 2 and identifies the major subassemblies and components. The flow of information between the blocks is denoted by lines with arrows which indicate the direction of signal flow. All operations of the machine are timed and synchronized with signals from the synchronous vibrator. The voltage to be classified is applied to the signal voltage input terminals (far left). Appropriate settings of the mode, range, class size, and volts (M) switches are made before initiating a read or scan command. After passing through a signal filter and the range divider, the voltage appears at one input of the error amplifier. Voltage from the volts (M) voltage generator is applied to a second input at the error amplifier. This "feedback" voltage is less than the signal input voltage initially. Error amplifier circuitry compares the two signals and generates a difference error signal which is amplified by succeeding stages in the error amplifier.

With the mode switch B in single scan position, pushing the scan button 10 will initiate a command to measure and classify the signal input voltage. The random timing of a manual scan command is synchronized with machine operation by signals from the synchronous vibrator and circuitry in the scan command synchronizing circuit. The timed output of the latter enables the scan gate to respond to periodic signals from the synchronous vibrator. The scan gate then generates triggering signals in synchronism with the synchronous vibrator. These triggering signals cause the 20 step counter to advance one count for each triggering signal it receives. Certain outputs from the counter cause relay switches to operate by means of the relay buffer amplifiers. The relay switches cause the voltage output of the class interval voltage generator to change by a small increment each time a count is received by the 20 step counter. Through appropriate circuit connections this incremental change is superimposed on the output of the volts (M) voltage generator. The magnitude of the increment is controlled by the setting of the class size switch C. The voltage change is in such a direction as to reduce the difference between the signal input voltage and the volts (M) voltage generator.

Thus, as the count in the counter advances, the difference error between these two signals becomes smaller in precisely controlled, step-like increments. When the feedback voltage exceeds the signal input voltage by a slight amount (predetermined by error amplifier calibration), an error pulse is generated and applied to the pulse generator.

In addition to controlling the class interval voltage generator, the 20 step counter sends logic signals to the decode matrix. The decode matrix selects sequentially one of nineteen signal lines, each associated with a particular display unit A at the display panel P. The 1st count into the counter will cause the —9 light bar assembly to be selected, the 2nd count —8, the 3rd count —7, and so through 19 counts ending with the +9 unit on the 19th count.

The pulse generator produces a timed pulse which disables the inhibit gate and permits the selected display unit A to respond to a signal emanating from the decode matrix. If the error pulse occurs on the 4th count, for example, the 4th line of the 19 decode matrix output counts is selected. The 4th line is associated with —6 light bar assembly. The coincidence of the pulse generator output and selected decode matrix output line causes a triggering signal to be sent to a power amplifier which in turn actuates a solenoid or electromagnet 37 (—6). The solenoid operates the mechanism in the display unit which increases the height of the said unit by one step.

Termination of the pulse generator output produces a signal which resets the 20 step counter to its zero count state and also resets the synchronizing logic in the scan command synchronizing circuit. This logic prevents the instrument from responding to any new scan commands until a reading and entry into the display unit has occurred.

Succeeding signal voltage inputs are measured and classified similarly. When the mode switch B is in auto scan position, the scan commands are generated by external circuits but routed through the mode switch.

To clear the light bar display of the display units A to a zero position, the mode switch B is placed in the reset position and the reset button 11 pressed. The light bar display reset control generates a number of signals which cause the display units to reset in a logical sequence. Actuation of the reset button 11 causes a reset start signal to disable the inhibit gate which permits the decode matrix outputs to drive their respective display unit solenoids. Then a gate enable signal is applied to one input of the display reset gate. Following this a reset oscillator signal consisting of periodic pulses is applied to a 2nd input of the display reset gate. This gate now responds by sending triggering pulses to the 20 step counter which begins advancing from its zero count state. Since the inhibit gate is disabled, each time the decode matrix selects one of nineteen signal lines a trigger pulse to the associated power amplifier and display unit solenoid will be generated if the unit is not at its zero position.

Thus, the light bars of the display units are caused to step (increase in height) sequentially in synchronism with the reset oscillator signal. Each illuminated light bar will advance vertically, disappear from view and stop at the zero or null position. The zero position of each light bar is sensed by the photocell 55. When the light bar arrives at the null position the photocell sends a signal to the decode matrix which disables the output line associated with that particular display unit, then no further signals to the power amplifier can be generated. This process continues until all light bars have been cleared to the zero or null position. The mode switch B is then returned to the desired mode of operation, "SINGLE SCAN" or "AUTO SCAN." Mechanical switches in the mode switch B generate a counter reset and reset clear signals. The "reset clear" acts to signal the light bar display unit reset control so as to remove the reset start, reset oscillator signal, gate enable signal and photocell voltage. The counter reset signal is delayed until the above occurs, then causes the 20 step counter to be reset to its zero count state. The instrument is now ready to measure and classify a new batch of voltages.

In accordance with the invention a novel combination of electronic components is provided as associated and clearly illustrated in the diagram in FIG. 2. In this respect, reference is made specifically to the 20 step counter 60, the decode matrix 70, the inhibit gate 80, the pulse generator 90, the error amplifier 100, the buffer amplifier 110, the class interval voltage generator 120, and the volts (M) generator 130. These various electronic components are correlated so as to effect class selection for the operation of the desired display unit A, and they are described as follows:

The process of class selection is initiated by permitting consecutive pulses to be conducted to the 20 step counter 60, and this is accomplished as by pressing the scan button 10 and thereby enabling the scan gate. The 20 step counter 60 comprises, in the case illustrated in FIG. 12, five flip-flop stages that are interrelated so as to count 0 through 19 pulses. A typical flip-flop circuit of this type is shown in FIG. 15 and wherein there are two transistors and associated diodes, resistors and capacitors capable of assuming one of two states, namely the states of on and off. A first input pulse to the first in the series of five flip-flop circuits causes it to change state or to be set, and a second input pulse resets the flip-flop. Reset of said first flip-flop sets the second flip-flop circuit, etc. There are two output conductors from each flip-flop, thus providing a total of ten conductors which constitute the 20 step counter output lines, each of which can be conditioned to produce, for example, 0 to 10 v.

The decode matrix 70 is provided for the purpose of discriminately selecting the various combinations of voltage conditions produced by the 20 step counter 60 above described and to direct a signal to the display unit A which is to be advanced. The decode matrix 70 comprises one gate circuit for each of the 19 decode matrix output lines and five matrix diodes per gate, such a single circuit being illustrated in FIG. 13. As shown, all 19 decode matrix gates are disabled by an inhibit gate 80 until an error comparison between the input and feedback voltage occurs at the input to the error amplifier 100. At this instant a pulse generated by the pulse generator 90 disables the inhibit gate 80 and permits the selected decode matrix output gate to send a signal to the power amplifier which thereby advances the drive means 27 associated with the particular output line selected.

The relay buffer amplifier 110 is connected to the ten 20 step counter output lines, preferably in the form of five pairs of buffer amplifier circuits as shown in FIG. 15. These amplifiers 110 are shown as operating in pairs and each involves a relay energized by a transistor circuit so as to insert or to remove a pair of precision resistors from a group of resistors in the class interval voltage generator 120.

The class interval voltage generator 120 provides predetermined incremental voltage the magnitude of which is established by the class size switch C as above described. Thus, there are five pairs of resistors, one of each pair being in or out of a voltage divider circuit in the class interval voltage generator 120.

The voltage output from the volts (M) generator 130 is selectively established by the volts (M) switches E with reference to a precision voltage reference, and this output voltage is modulated or changed by the incremental output of the class interval voltage generator 120. As a result, there is an algebraic combination of voltages which is conducted to the error amplifier 100 as a feedback and which is compared to the signal input voltage at said error amplifier, all to the end that said error amplifier generates a difference error signal when the feedback voltage exceeds the input voltage but very slightly.

From the foregoing it will be apparent how the instrument is put to practical use with a multiplicity of display units A forming a bar-graph and wherein each unit A compiles data associated with a selected class. The compilation of data is instantaneous and is presented on the display panel P for observation and recording. By means of the resetting procedure above set forth and with the use of the null means 29 the display units A are ready to start anew.

Having described our invention, we claim:

1. A bar-graph display instrument comprising, means sensitive to various classes of input voltage, and a multiplicity of like and adjacently related visible bar producing units and each including, a fixed carriage with a narrow and elongated observation edge disposed in a common plane from a common base line, a partially visible and continuous loop-shaped element movable longitudinally and advancively only and incrementally over said observation edge and with a discernable light transmitting portion thereon, a first light source and uniformly reflective element within the carriage and disposed to project light coextensive of said observation edge and forwardly therefrom, a drive means for the element and operable to advance only said element in response to a pulse, and means associated with said unit and drive means therefor to sense a predetermined class of input voltage from the first mentioned means and to deliver a pulse to the drive means and thereby advance the discernable portion of the element to a longitudinal position, there being an opaque and light reflective area on said element, and means positioned on the carriage at said common base line and sensitive to a second light source to control said drive means and thereby limit repositioning of said element upon traverse of said opaque and reflective area relative to said last mentioned means.

2. A bar-graph display instrument comprising, means sensitive to various classes of input voltage, and a multiplicity of like and adjacently related visible bar producing units and each including, a fixed carriage with a narrow and elongated observation edge disposed in a common plane from a common base line, a partially visible and continuous loop-shaped element with perforations therealong and movable longitudinally and advancively only and incrementally over said observation edge and with a discernable light transmitting portion thereon, a first light source and uniformly reflective element within the carriage and disposed to project light coextensive of said observation edge and forwardly therefrom, a drive means for the element and including a pawl for engagement with the perforations in the element and means to reciprocate the pawl and operable only to advance said element in response to a pulse, and means associated with said unit and drive means therefor to sense a predetermined class of input voltage from the first mentioned means and to deliver a pulse to the drive means and thereby advance the discernable portion of the element to a longitudinal position, there being an opaque and light reflective area on said element, and means positioned on the carriage at said common base line and sensitive to a second light source to control said drive means and thereby limit repositioning of said element upon traverse of said opaque and reflective areas relative to said last mentioned means.

(References on following page)

References Cited

UNITED STATES PATENTS

| | | | |
|---|---|---|---|
| 2,212,161 | 8/1940 | Kirton | 116—135 XR |
| 2,307,660 | 1/1943 | Bascom | 340—379 XR |
| 2,488,338 | 11/1949 | Senegas | 116—135 |
| 2,561,885 | 7/1951 | Prideaux et al. | 340—380 XR |
| 2,804,041 | 8/1957 | Neugass | 116—135 XR |
| 3,115,289 | 12/1963 | Namenyi-Katz | 179—100.2 XR |
| 2,168,443 | 8/1939 | Johnson | 340—378 |
| 1,143,598 | 6/1915 | Frum | 235—35 |
| 2,971,716 | 2/1961 | Sampson | 250—219 |
| 2,972,126 | 2/1961 | Hecox | 324—99 |
| 3,054,960 | 9/1962 | Pearlman | 328—116 |

FOREIGN PATENTS

| | | |
|---|---|---|
| 258,347 | 11/1948 | Switzerland. |
| 1,113,872 | 9/1961 | Germany. |

RUDOLPH V. ROLINEC, *Primary Examiner.*

E. F. KARLSEN, *Assistant Examiner.*

U.S. Cl. X.R.

324—99; 328—116; 340—378; 116—135